United States Patent [19]

Airhart

[11] Patent Number: 4,660,674
[45] Date of Patent: Apr. 28, 1987

[54] MOUNTING AND CONTROL MEANS FOR FULL WAVEFORM SEISMIC SOURCE

[75] Inventor: Tom P. Airhart, Plano, Tex.

[73] Assignee: Atlantic Richfield Company, Los Angeles, Calif.

[21] Appl. No.: 676,762

[22] Filed: Nov. 30, 1984

[51] Int. Cl.⁴ .............................................. G01V 1/02
[52] U.S. Cl. .................................. 181/113; 181/114; 181/121; 367/189
[58] Field of Search ................ 367/189, 190; 181/113, 181/114, 121, 401; 33/519

[56] References Cited

U.S. PATENT DOCUMENTS

| | | | |
|---|---|---|---|
| 3,731,386 | 5/1973 | Kreiensen et al. | 33/519 |
| 4,390,077 | 6/1983 | Fulkerson | 181/114 |
| 4,421,198 | 12/1983 | Miller | 181/114 |

Primary Examiner—Charles T. Jordan
Assistant Examiner—John W. Eldred
Attorney, Agent, or Firm—Robert M. Betz

[57] ABSTRACT

A full waveform seismic source is described which is adapted to propel a heavy mass powerfully downward against the surface of an earth-contacting target plate. Means are provided for rotating the barrel of the actuator about two mutually perpendicular horizontal axes so that energy can be delivered to the earth along a plurality of preselected slant paths. In this way, any desired combination of compressional and shear waves, both SH and SV type, may be generated at a point on the earth's surface. The target is contoured so that any slant path followed by the accelerating mass always impacts the target normal to its surface.

7 Claims, 6 Drawing Figures

MOUNTING AND CONTROL MEANS FOR FULL WAVEFORM SEISMIC SOURCE

BACKGROUND OF THE INVENTION

1. Field of the Invention

This invention relates generally to the field of seismic exploration and more particularly to apparatus for the generation of combined compressional and shear waves.

2. Description of the Prior Art

Injection of seismic signals into the earth by means of apparatus which utilizes compressed gas to propel an impact mass against a rigid earth contacting target as described in detailed in U.S. Pat. Nos. 4,284,164 and 4,284,165, both issued Aug. 18, 1981 and entitled "Acoustic Pulse Generator". A significant advantage of such devices is their ability to produce rapidly repeated seismic signals of variable carefully controlled energy content. Devices of these character are therefore well suited to the production of combined compressional and shear waves.

Recent advances in the ability of seismic data acquisition and processing equipment to handle large amounts of data have stimulated greater interest in the development of versatile high seismic sources adapted to produce both compressional and shear waves. By recording the full waveform of a seismic wave, including P, SH and SV waves, one can get far more detailed information concerning rock properties and depth. With the aid of the invention to be described, devices of the type disclosed in the above referenced patents constitute efficient means for producing such combined compressional and shear waves.

The actuator assembly for seismic sources such as described in the above referenced patents typically includes an impact mass weighing several thousands of pounds which must be propelled downwardly by compressed gas or the like against a rigid target resting on the earth beneath it. In order to generate a desired combination of P, SH and SV waves, it is necessary to be able to operate the source so that this heavy impact mass will travel along a selected slant path to the target. The term "full waveform seismic sourcep" as used in this application means a device which can be manipulated in position so that this slant path may be readily varied through 360 degress of aximuth at 90 degree intervals. Such a slant path needs to be achieved with precision, that is to say, within a degree or so of a prescribed inclination and azimuth. Furthermore, the mechanism whereby this can be accomplished, practically speaking, must be transportable by means of a highly mobil vehicle from place to place along an extended line of survey. Achieving the kind of accuracy and maneuverability which is required for these purposes in a vehicle mounted system presents a challenge.

It is therefore a general object of this invention to provide a seismic source with improved means for mounting and controlling such source which delivers energy to a selected point on the earth along any of a plurality of selected slant paths.

It is a more particular object of this invention to provide such a seismic source wherein a heavy impact mass is accelerated downwardly along any such slant paths to impact a rigid earth-contacting target.

Other and further objects and advantages of the invention will becme apparent from a consideration of the detailed description and drawings to follow taken in conjunction with the appended claims.

SUMMARY OF THE INVENTION

In accordance with the preferred embodiment of this invention, a seismic source is described which can be controlled so as to deliver energy to a point on the earth's surface along a plurality of preset vector paths inclined in any direction from the vertical. Broadly speaking, the source comprises a hollow cylindrical housing, an impact mass slideably interfitted with the housing for limited movement along the longitudinal housing axis, means for supporting the housing and the mass above the earth, means for tilting the housing axis selectively about either of two mutually perpendicular horizontal pivot axes so that the housing axis is aligned with a preset slant path, and means within the housing for applying thrust to the impact mass causing it to accelerate downwardly to impact the earth.

DETAILED DESCRIPTION OF THE PREFERRED EMBODIMENTS

Figure 1:
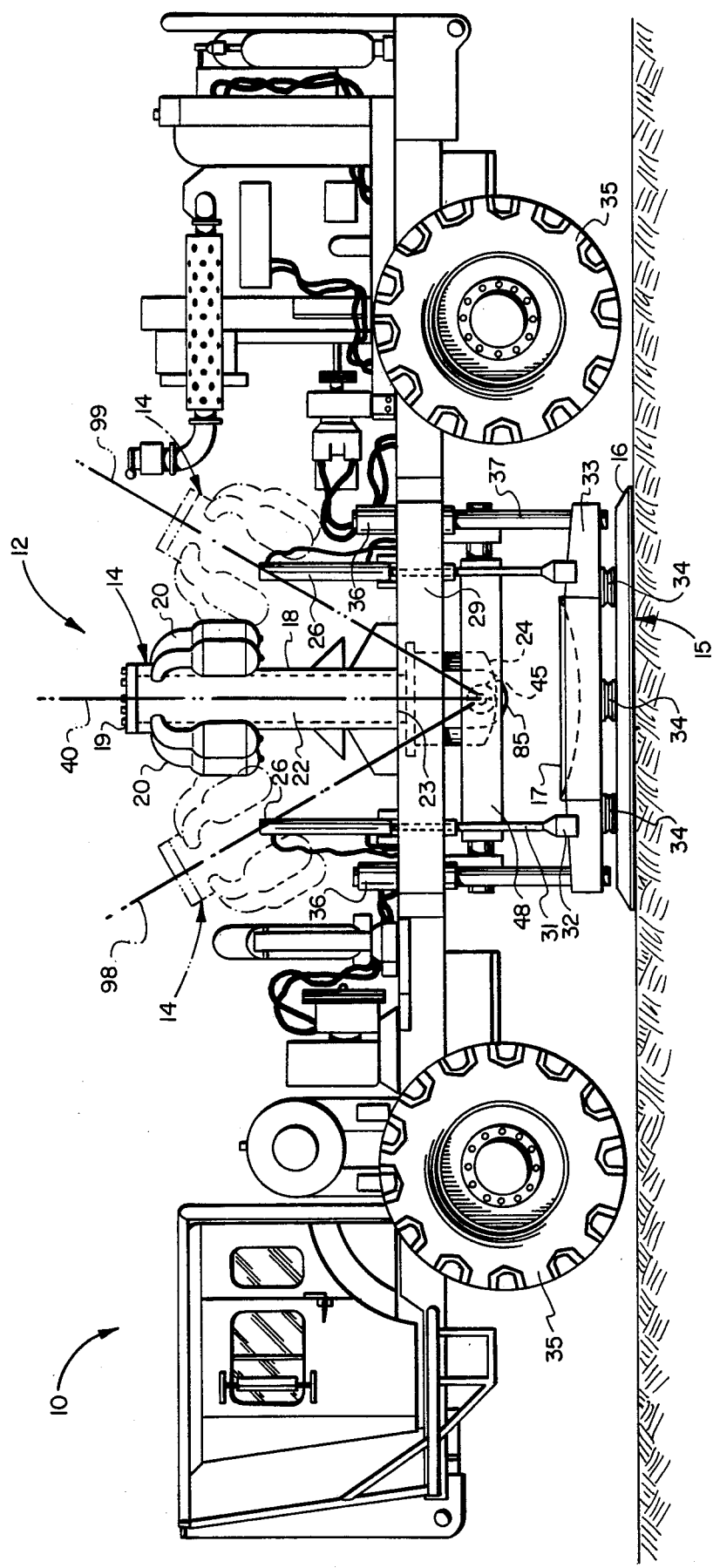
FIG. 1 is an elevational side view in accordance with the preferred embodiment of this invention illustrating a vehicle-mounted seismic source of the type described positioned above a rigid target positionable on the earth.

With reference now generally to FIG. 1, there is illustrated a motorized transport vehicle 10 upon which is mounted a seismic source 12 consisting generally of actuator assembly 14 and a target 15 which may be lowered to rest on the earth. Target 15 comprises generally a base plate 16 and an upper striker plate 17 having a concave upper surface.

Actuator assembly 14 comprises a hollow cylindrical barrel 18, the closed upper end 19 of which is provided with a plurality of ports (not shown) communicating with a like number of external compressed air containers 20. Barrel 18 contains a piston 22 which extends downwardly from the open lower end 23 of barrel 18 and terminates in a heavy impact mass 24.

In a manner detailed thoroughly in U.S. Pat. Nos. 4,284,164 and 4,284,165, when source 12 is to be operated, mass 24 is retracted upwardly until piston 22 blocks or seals off the above referenced ports in barrel 18. Four upstanding lift cylinders 26, two of which are visible in FIG. 1, are secured adjacent the four corners of centrally located fixed vehicle frame 29. Working within each cylinder 26 is a piston (not shown) with a downwardly projecting rod 31 welded to one of adapters 32 attached respectively adjacent the four corners of cross beam frame 33 which is secured to the top of base plate 16 by means of a plurality of shock isolators 34. Extension of rods 31 provides downward thrust against cross beam frame 33 and base plate 16. In reaction, cylinders 26 provide upward thrust against vehicle frame 29 which raises vehicle 10 off its spring suspension until one or both sets of tires 35 clear the ground. This brings the weight of vehicle 10 partially or fully to bear on target 15.

Extending downwardly through frame 29 parallel to cylinders 26 are a like number of sleeve guides 36 adapted to receive guide shafts 37, the lower ends of which are rigidly attached to cross beam frame 33. Shafts 37 move integrally with rods 31 upwardly and downwardly. This prevents lateral loads from causing buckling or failure of lift cylinders 26 particularly in their extended state. Details of operation of elements such as lift cylinders 26 and sleeve guides 36 are set forth more particularly in U.S. Pat. No. 4,402,381 issued to Tom P. Airhart, Sept. 6, 1983.

When a firing signal is given, mass 24 is released by operating suitable trigger means (not shown). The resultant downward gravity displacement of piston 22 exposes the side ports in barrel 18 allowing entry of compressed gas therein from chambers 20 so as to exert a powerful downward accelerating force upon piston 22. In this way, impact mass 24 is driven against striker plate 17 of target 15 to generate a seismic pulse of interest. Actuator assembly 14 is positioned at or close to the center of mass of vehicle 10 so as to eliminate as much as possible the unbalancing effect of powerful recoil forces in operation.

The succeeding description is particularly concerned with the manner in which actuator assembly 14 is mounted and manipulated to enable an operator to rapidly tilt the axis of barrel 18 from a vertical path 40 to any of a plurality of inclined paths without moving vehicle 10. For the sake of simplicity, many features of vehicle 10 and its related equipment associated with the operation of source 12 have been omitted where they are either conventional or well within the skill of the art and their description is unnecessary to an understanding of this invention.

Figure 2:
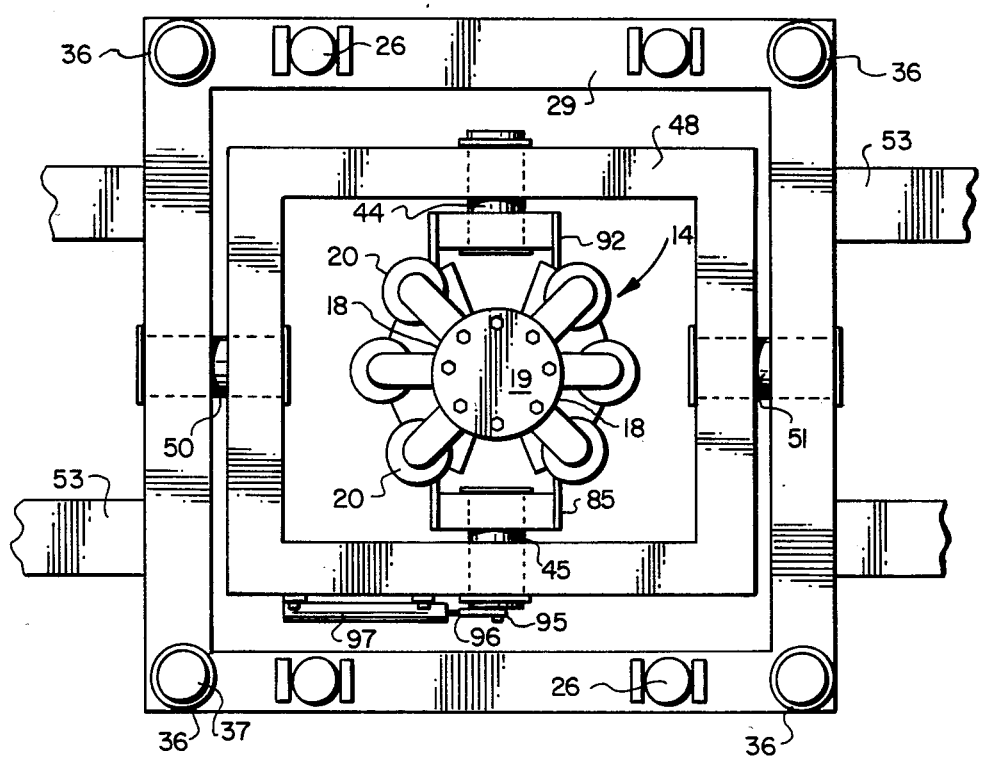
FIG. 2 is a detailed plan view of the source illustrated in FIG. 1 showing its actuator assembly, a surrounding yoke and an outer fixed vehicle frame, together with the mutually perpendicular axles for rotatably interconnecting these elements.

Referring now particularly to FIG. 2, actuator assembly 14 is shown extending vertically as mounted on horizontal axles 44 and 45 rotatable within a surrounding rectangular yoke 48. Yoke 48 is provided with a further pair of horizontal axles 50 and 51 extending at right angles to axles 44 and 45 for rotation within fixed vehicle frame 29. Frame 29 is rigidly interconnected with longitudinal chassis members 53. It is apparent that this arrangement provides actuator assembly 14 with two degrees of rotational freedom. That is to say, actuator assembly 14 may be tilted fore and aft with respect to vehicle 10 by rotation of axles 44 and 45 and from side to side by rotation of axles 50 and 51. The allowable tilt in any of these four directions depends upon the design of vehicle 10 and source 12, a maximum of 30 degrees variation from the vertical in any rotational sense being found sufficient for much important geophysical work.

Figure 3:
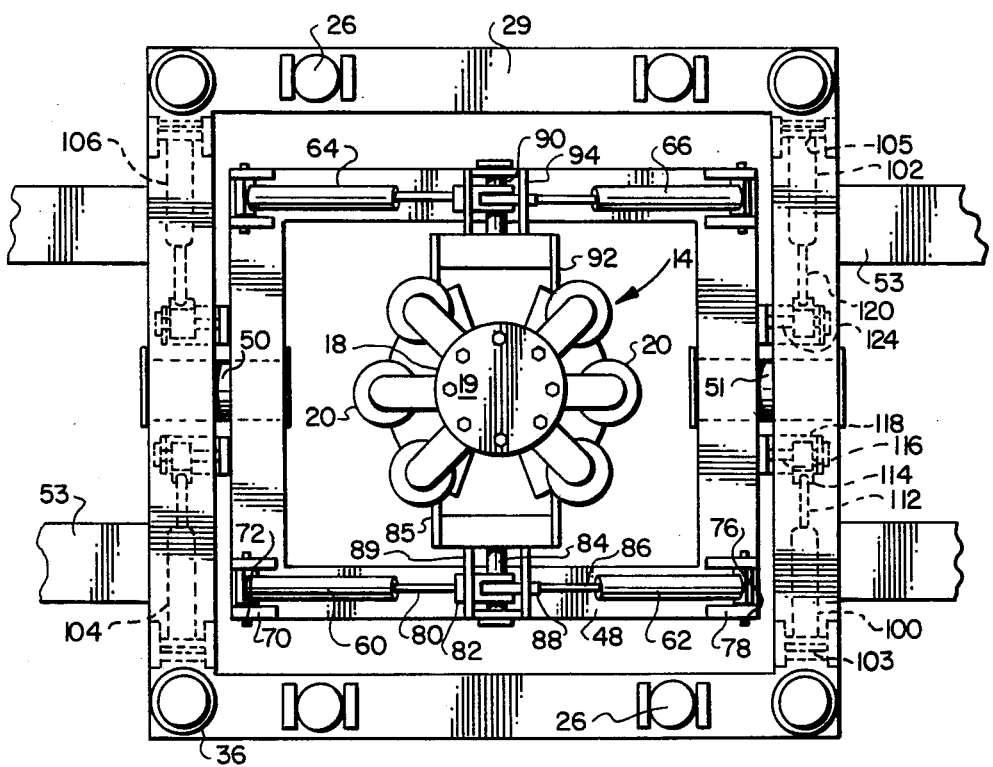
FIG. 3 is a detailed plan view of the seismic source of this invention similar to that of FIG. 2, further illustrating two parallel pairs of hydraulic cylinders for tilting the actuator assembly and two further parallel pairs of hydraulic cylinders (shown in phantom) for tilting the yoke.

FIG. 3 illustrates in plan the means by which the tilt motion of actuator assembly 14 and yoke 48 are accomplishd. Extending along opposite sides of actuator 14 and mounted on yoke 48 are two pairs of opposing or oppositely directed hydraulic cylinders. One such pair consist of cylinders 60 and 62, the other of cylinders 64 and 66. The construction and operation of cylinders 60 and 62 is exactly the same as that of cylinders 64 and 66 and thus only the former will be described in detail. Cylinder 60 is pivotally mounted within bracket 70 fixed to one corner of yoke 48 for rotation about the axis of pivot 72. Similarly, cylinder 62 rotates about the axis of pivot pin 76 situated within mounting bracket 78 located at a further corner of yoke 48. Piston 80 of hydraulic cylinder 60 terminates in a rod clevis 82 which surrounds horizontally extending tilt pin 84 by rigidly attached to thrust bearing wing 85 mounted on the sidewall of barrel 18. In like manner, piston 86 of cylinder 62 of cylinder 62 terminates in a rod clevis 88 which also surrounds pin 84 and dovetails within the end of clevis 82. The outward end of pin 84 is held in place by mounting frame 89 extending laterally from wing 85.

Figure 4:
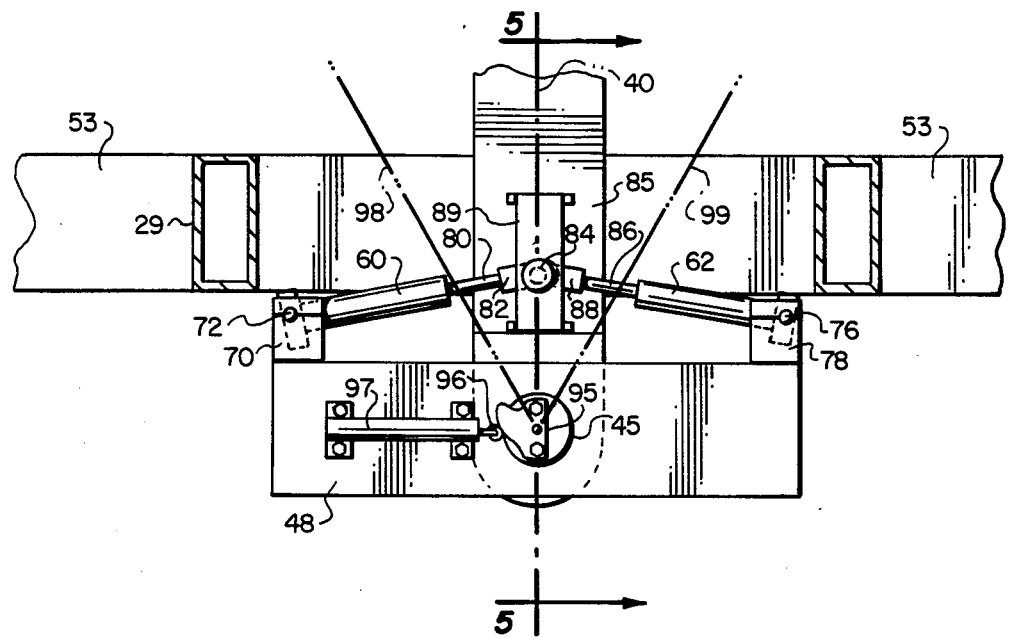
FIG. 4 is a detailed side view of the seismic source of FIG. 1 showing one pair of actuator-tilting hydraulic cylinders together with means for sensing the tilt position of such actuator assembly. The yoke-tilting hydraulic cylinders are omitted.

As best seen in FIG. 4, tilt pin 84 is vertically offset above axle 45 so that the axes of cylinders 60 and 62 slant upwardly in opposite directions to engage pin 84. By means well known in the art, suitable electrical control signals are provided to operate cylinders 60 and 62 in opposition or "push-pull" in either direction. For example, if rod 80 is retracted rod 86 is extended at the same time and pin 84 is thrust in a direction to cause actuator assembly 14 to tilt or rotate with respect to axles 44 and 45 in a counterclockwise sense or forwardly with respect to vehicle 10. In order to equalize the rotational forces generated in the manner described on both sides of actuator assembly 14 and to avoid undesirable linear forces cylinders 64 and 66 are operated in tandem with cylinders 60 and 62 on the opposite side of actuator assembly 14. Thus, horizontal tilt pin 90 fixed to thrust bearing wing 92 and supported by frame 94 is engaged by cylinders 64 and 66 so as to enable application of a torque to actuator assembly 14 balancing the tilting force described above.

With further reference to FIG. 4, a cam 95 is fastened over the end of axle 45 which extends through the wall of yoke 48. Rotation of barrel 18 on axles 44 and 45 causes cam 95 to depress or permit linear extension of cam roller 96 extending from linear variable displacement transducer 97 mounted on a vertical sidewall of yoke 48. By means well known in the art, this linear displacement may be converted to a variation in electrical signal which is proportional to the angular rotation of actuator assembly 14 from some reference axial position such as vertical path 40. By comparison with a preset position this signal enables a suitable control device to stop the motion of hydraulic cylinders 60, 62, 64 and 66 when the axis of actuator assembly 14 reaches any desired slant position such as, for example path 98 or path 99.

Figure 6:
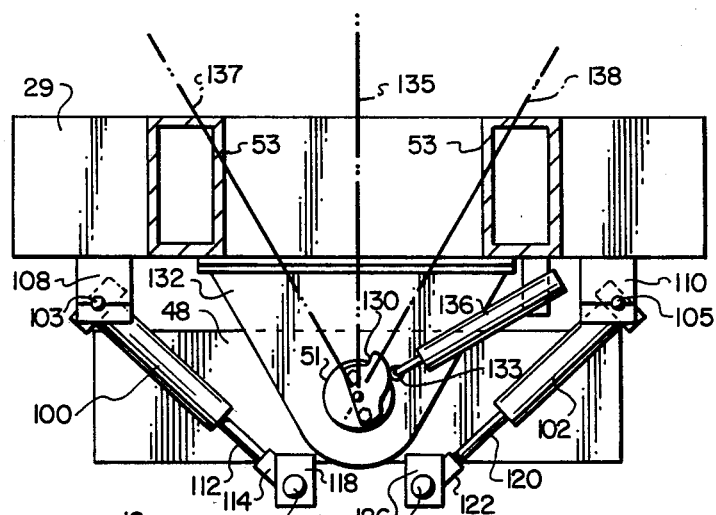
FIG. 6 is a detailed rear view of the seismic source of FIG. 1 illustrating one set of yoke-tilting hydraulic cylinders together with means for sensing the rotational position of the yoke. The actuator-tilting cylinders are omitted.

The manner in which yoke 48 may be tilted or rotated on axles 50 and 51 from side to side is best understood with further reference to FIG. 3 and to the detail of FIG. 6. As shown in FIG. 6, a pair of hydraulic cylinders 100 and 102 are rotatable respectively about parallel horizontal axes on pivots 103 and 105 carried by bracket 108 and 110 depending from fixed frame 29. Another pair of such oppositely directed hydraulic cylinders (as shown in phantom in FIG. 3) are disposed on the opposite or front side of yoke 48. They are constructed and operated in an identical manner to cylinders 100 and 102 and therefore will not be described in great detail. Piston 112 of cylinder 100 terminates in knuckle 114 which is rotatable about pin 116 fixed to bracket 118 depending from yoke 48. Similarly, piston 120 of cylinder 102 terminates in knuckle 122 rotatable about pin 124 in dependent bracket 126.

In fashion similar to that described to effect tilt of actuator assembly 14, an opposite or push-pull operation of hydraulic cylinders 100 and 102 in tandem with the parallel pair of hydraulic cylinders 104 and 106 produces a tilt or rotation of yoke 48 in either sense about axles 50 and 51. Cam 130 bolted to fixed lower frame extension 132 integral with frame 29 is followed by cam roller 133. Therefore, the angular tilt of yoke 48 from a reference position such as path 135 is read by linear variable displacement transducer 136. The amount and sense of rotation or tilt of yoke 48 from side to side with respect to vehicle 10 as, for example, to slant paths 137 or 138 can be monitored, controlled and indicated.

Figure 5:
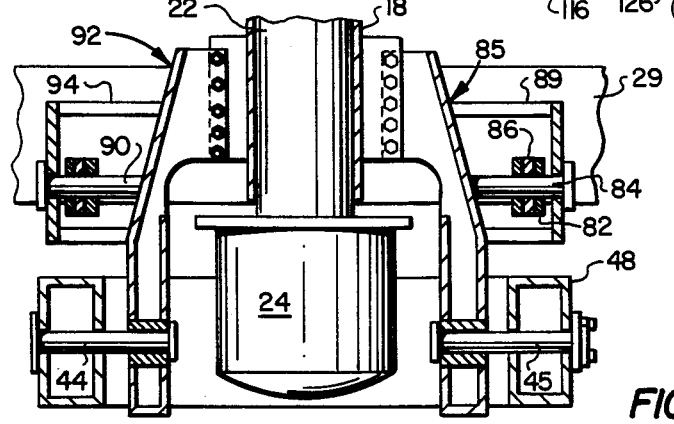
FIG. 5 is a detailed vertical section taken along the line 5—5 in FIG. 4 showing the wings for supporting the actuator assembly axles and the actuator tilt pins.

FIG. 5 provides a sectional view showing the position of attachment to barrel 18 of thrust bearing wings 85 and 92. When source 12 is fired driving mass 24 downward against target 15 powerful recoil forces exerted upwardly against barrel 18 are transmitted to vehicle 10 by means of wings 85 and 92. An advantage of the design of this invention is that axles 44 and 45 are brought as close together as possible while still providing sufficient clearance for travel of mass 24. This contributes to smooth and efficient operation of the mechanism for tilting actuator assembly 14, which may weigh many thousands of pounds. For similar reasons the fore and aft clearance between the yoke 48 and vehicle frame 29 is reduced to a minimum.

Details of the electrical and hydraulic lines required for operation of the apparatus of this invention as described above have been omitted for simplicity. Clearly a central controller (not shown) can be utilized to provide electrical signals which are converted into appropriate action of the various hydraulic cylinders. Such controller may further be used to monitor the precise slant path or inclinication of actuator assembly 14 as described. Preset positions of actuator assembly 14 can be stored in a microprocesor (not shown) for continuous comparison with the output of linear variable displacement transducers 97 and 136. In addition, of course, such a controller can perform related functions such as to operate lift cylinders 26, to raise and lower target plate 16, to deliver a firing signal as desired, and to operate means for retraction of mass 24 and piston 22 to their uppermost positions preparatory to the next shot.

In summary what has been described is a novel system and apparatus for injecting seismic energy into the earth along slant paths in any direction. One of the advantages of the system of this invention is inherent in the power and reliability of hydraulic cylinders as a means for moving heavy masses and to control the very large force moments created without overshoot. Experiments indicate that the actuator assembly 14 may be shifted from a vertical orientation to any desired preset slant path within one to two seconds.

The particular configuration and mode of operation of the seismic source described herein as well as other features of the mounting and control system are illustrative only and many modifications will occur to those skilled in the art without departing from the scope of this invention as more particularly set forth in the appended claims.

What is claimed is:

1. Apparatus for generating combined shear and compressional waves in the earth comprising in combination:
   (a) a rigid target plate positionable on the earth,
   (b) an upstanding cylindrical housing having an open bottom,
   (c) means for supporting said cylindrical housing above said target plate for rotation about two mutually perpendicular horizontal axes,
   (d) an impact mass slideably interfitted with said housing for movement axially thereof,
   (e) means for rotation of said housing about said axes such that the longitudinal axis of said housing lies along a selected path, and
   (f) means for accelerating said impact mass downwardly to impact said target plate along said slant path.

2. Apparatus as in claim 1 wherein said mutually perpendicular axes are intersecting.

3. Apparatus for generating combined shear and compresional waves in the earth comprising in combination:
   (a) a rigid target plate positionable on the earth,
   (b) an upstanding cylindrical housing having an open bottom,
   (c) a yoke within which said housing is pivotally supported for rotation about a first horizontal pivot axis,
   (d) a fixed frame within which said yoke is supported for rotation about a second horizontal axis perpendicular to said first pivot axis,
   (e) an impact mass slideably interfitted with said housing for movement axially thereof,
   (f) means for rotation of said housing and said yoke about said first and second pivot axes respectively such that the longitudinal axis of said housing is directed along a selected slant path, and
   (g) means for accelerating said impact mass downwardly to impact said target plate along said slant path.

4. Apparatus as in claim 3 wherein said rotation means comprises a first pair of hydraulic cylinders mounted respectively on said yoke on opposite sides of said first pivot axis, each of said first pair of cylinders being interconnected between said yoke and a position on said housing longitudinally offset from said pivot axis, and means for operating said first paid of cylinders in push-pull relation to exert force on said housing at said position in a direction to cause said housing to tilt about said first pivot axis.

5. Apparatus as in claim 4 wherein said rotation means further comprises a second pair of hydraulic cylinders mounted on said fixed vehicle frame on opposite sides of said second pivot axis, each of said second pair of cylinders being interconnected between said vehicle frame and said yoke at positions on said yoke respectively offset from said second pivot axis in a direction perpendicular to the plane of said yoke, and means for operating said second pair of cylinders in push-pull relation to exert a force on said yoke at said positions in a direction to cause said yoke to tilt about said second pivot axis.

6. Apparatus as in claim 5 wherein said first and second pairs of hydraulic cylinders are operable simultaneously.

7. Apparatus for generating combined shear and compressional waves in the earth comprising in combination:
(a) a rigid target plate positionable on the earth,
(b) an upstanding cylindrical housing having an open bottom,
(c) a yoke within which said housing is pivotally supported for rotation about a first horizontal pivot axis,
(d) a fixed frame within which said yoke is supported for rotation about a second horizontal axis perpendicular to said first pivot axis,
(e) an impact mass slideably interfitted with said housing for movement axially thereof,
(f) means for rotation of said housing and said yoke about said first and second pivot axes respectively such that the longitudinal axis of said housing is directed along a selected slant path, wherein said rotation means comprises (i) a first pair of hydraulic cylinders mounted respectively on said yoke on opposite sides of said first pivot axis, each of said first pair of cylinders being interconnected between said yoke and a position on said housing longitudinally offset from said pivot axis, and means for operating said first paid of cylinders in push-pull relation to exert a force on said housing at said position in a direction to cause said housing to tilt about said first pivot axis, and (ii) a second pair of hydraulic cylinders mounted on said fixed vehicle frame on opposite sides of said second pivot axis, each of said second pair of cylinders being interconnected between said vehicle frame and said yoke at positions on said yoke respectively offset from said second pivot axis in a direction perpendicular to the plane of said yoke, and means for operating said second pair of cylinders in push-pull relation to exert a force on said yoke at said positions in a direction to cause said yoke to tilt about said second pivot axis;
(g) means for accelerating said impact mass downwardly to impact said target plate along said slant path; and
(h) wherein the position on said housing with which said first pair of cylinders is interconnected lies between the upper end of said housing and said first axis and, wherein the positions on said yoke with which said second pair of cylinders are interconnected lie beneath the plane of said yoke.

* * * * *